Nov. 30, 1926.
G. A. BUTTRESS
1,608,768
MECHANISM FOR MANUFACTURING HOLLOW BLOCKS
Filed Feb. 26, 1924   3 Sheets-Sheet 1
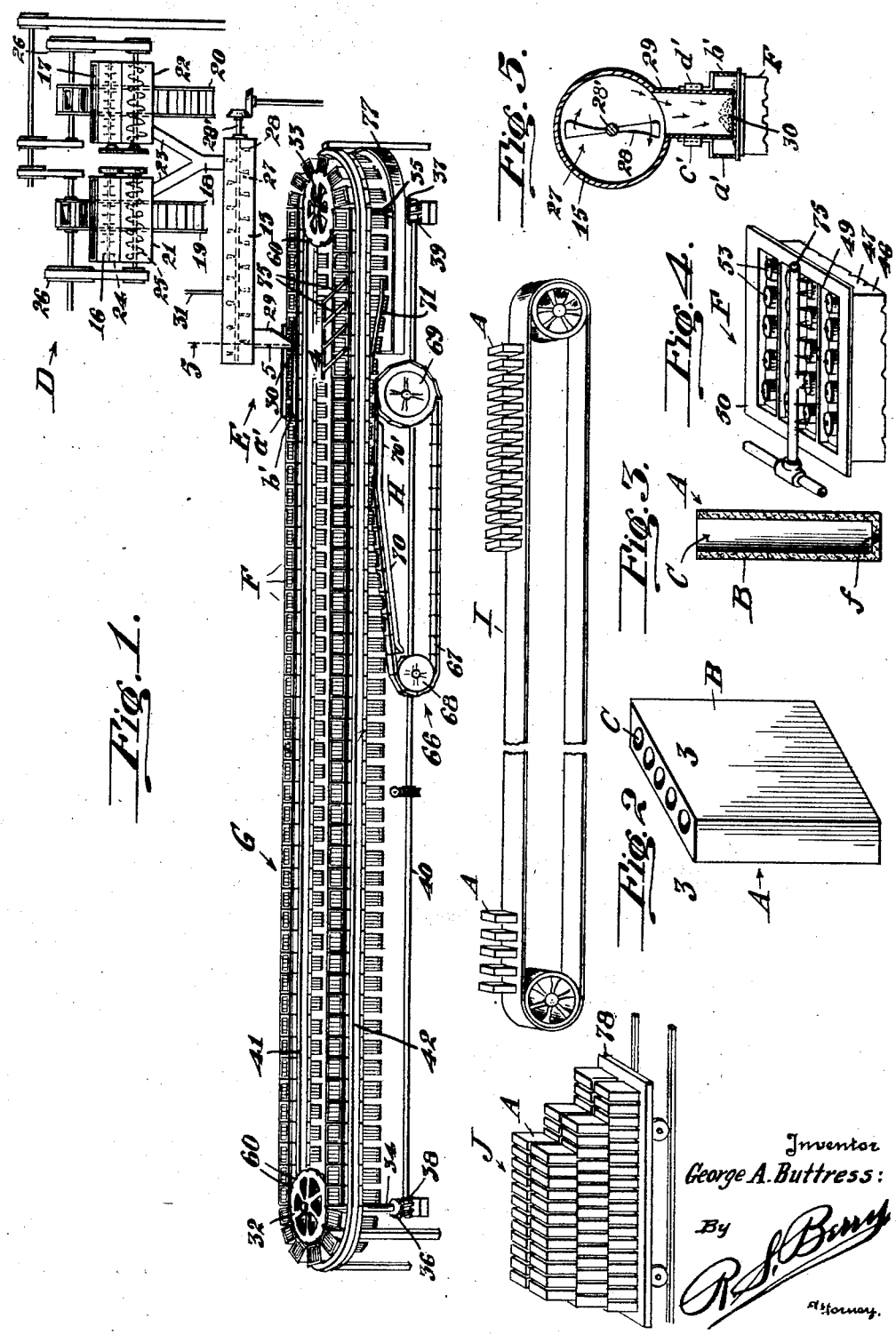
Inventor
George A. Buttress:
By
R. S. Berry
Attorney.

Nov. 30, 1926.  
G. A. BUTTRESS  
1,608,768  
MECHANISM FOR MANUFACTURING HOLLOW BLOCKS  
Filed Feb. 26, 1924   3 Sheets-Sheet 2
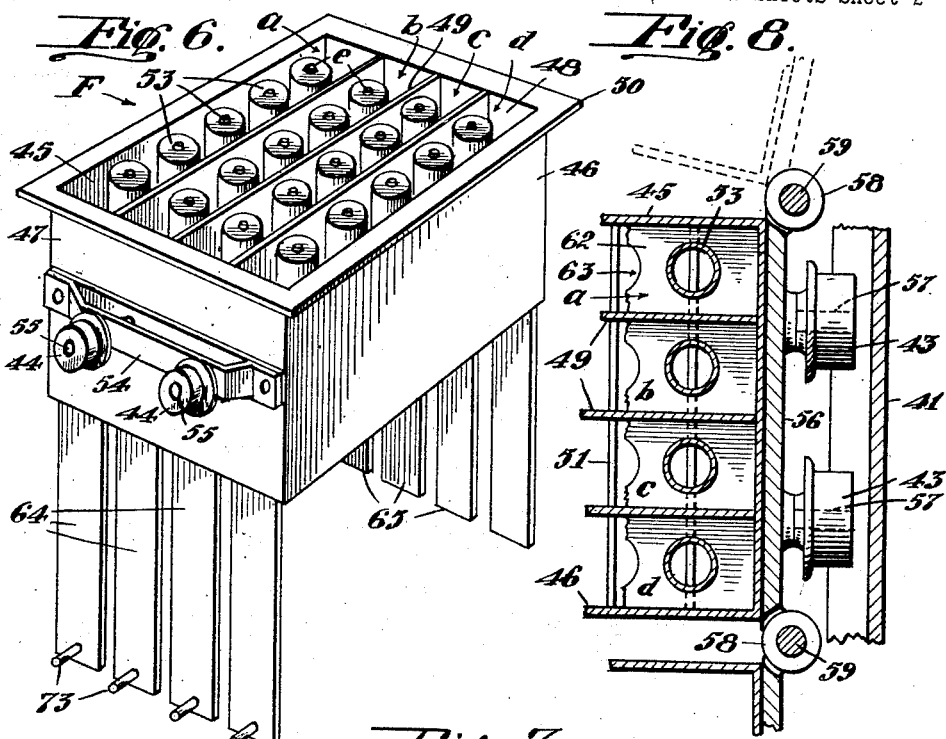
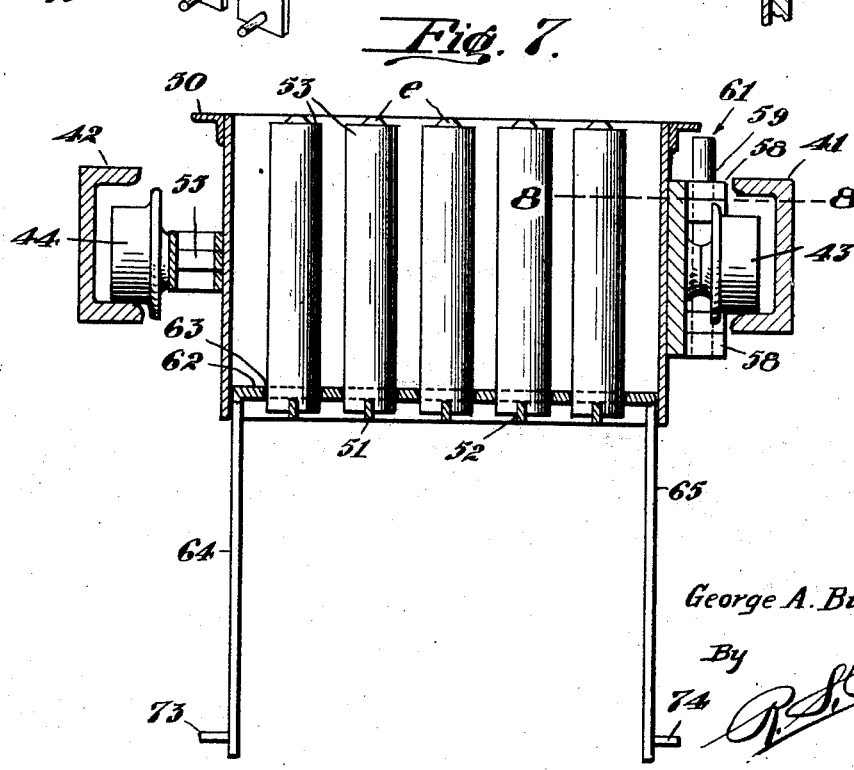
Inventor  
George A. Buttress Nov. 30, 1926.
G. A. BUTTRESS
1,608,768
MECHANISM FOR MANUFACTURING HOLLOW BLOCKS
Filed Feb. 26, 1924     3 Sheets-Sheet 3
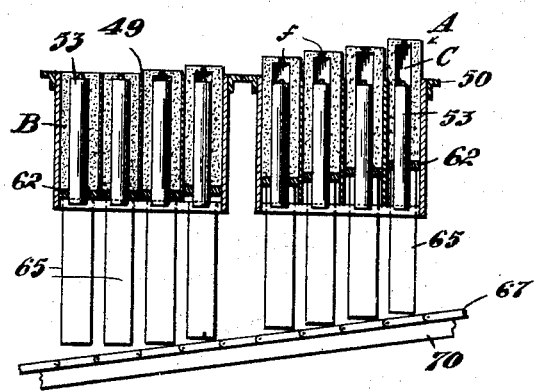
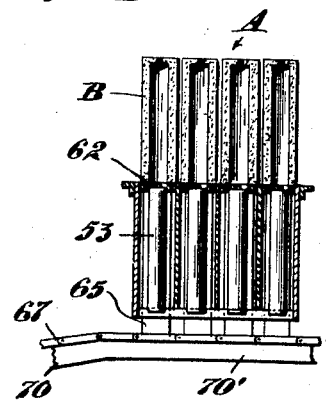
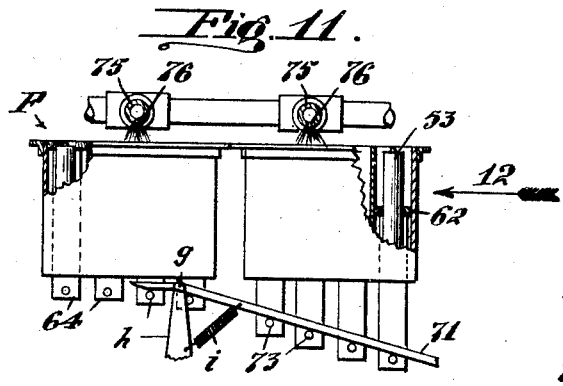
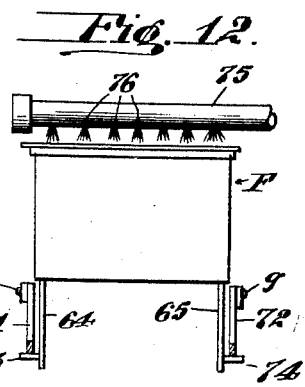
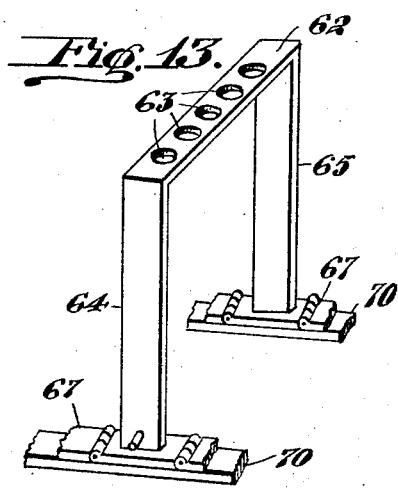
Inventor
George A. Buttress;
By R. S. Berry
Attorney Patented Nov. 30, 1926.

1,608,768

UNITED STATES PATENT OFFICE.

GEORGE A. BUTTRESS, OF LOS ANGELES, CALIFORNIA, ASSIGNOR TO BUTTRESS GYPSUM TILE COMPANY, OF LOS ANGELES, CALIFORNIA, A CORPORATION OF CALIFORNIA.

MECHANISM FOR MANUFACTURING HOLLOW BLOCKS.

Application filed February 26, 1924. Serial No. 695,138.

This invention relates to the manufacture of hollow blocks, formed of plastic material and particularly pertains to a machine and to parts and features thereof, for forming blocks from a composition of plaster of Paris which blocks are especially adapted for use in the erection of the interior walls or partitions in building construction.

An object of this invention is to provide a mechanism whereby hollow blocks may be formed of a plastic material with accuracy and rapidity and with a negligible waste of material whereby the blocks may be economically produced in large quantities.
Another object is to provide a block forming machine which operates in such manner as to mold the blocks separately and eject them in a finished form, and which embodies a series of molds carried by an endless conveyor adapted to be maintained continuously in motion during operation of the machine, and which so coacts with other elements that the blocks will be formed and ejected without stop and start, or intermittent or delayed movement of the conveyor, thereby enabling great rapidity of output of the machine.

Another object is to provide a block molding machine in which a gang of molds will be employed, and each mold adapted to form a plurality of blocks at the same time, and in which the blocks will be ejected successively from the molds.

Another object is to provide a block molding machine which is particularly adapted to mold blocks from a quick setting plastic composition.

With the foregoing objects in view, together with such other objects and advantages as may subsequently appear, my invention resides in the parts, and in the construction, combination and arrangements of parts or their equivalents, and in the steps and features hereinafter described and claimed, and illustrated by way of example in the accompanying drawings, in which—

Figure 1 is a diagram in perspective illustrating a form of the mechanism employed in carrying out the invention.
Figure 2 is a perspective view illustrating a hollow block constituting the product of the mechanism shown in Figure 1.

Figure 3 is a detail in cross section as seen on the line 3—3 of Figure 2.

Figure 4 is a fragmentary perspective view as seen at the point indicated by the numeral 4 in Figure 1, illustrating the manner of lubricating the mold box.

Figure 5 is an enlarged detail in section as seen on the line 5—5 of Figure 1, showing the manner of feeding plastic composition to the mold box.

Figure 6 is a perspective view of the mold box.

Figure 7 is a view of the mold box as seen in vertical section and elevation.

Figure 8 is a view in horizontal section of the mold box as seen on the line 8—8 of Figure 7, illustrating the manner of hingedly connecting adjacent mold boxes together for relative articulate movement.

Figures 9 and 10 are views in vertical section illustrating the manner of ejecting the blocks from the molds.

Figure 11 is a view in elevation, partly in section, showing the manner of restoring the molds to a normal position after ejection of the blocks therefrom, and illustrating the manner of lubricating the mold boxes.

Figure 12 is a view in end elevation as indicated by the arrow 12 in Figure 11.

Figure 13 is a detail in perspective illustrating the manner of constructing and operating the false bottom employed in the molds.

My invention contemplates the manufacture of a hollow block A having a body B of rectangular form, the body being formed with a plurality of openings C extending nearly therethrough from one edge thereof, as shown in Figure 3; the openings C being preferably substantially cylindrical. The blocks are molded of a suitable plastic material preferably consisting of a quick setting plaster formed of gypsum or plaster of Paris mixed with water and containing sawdust or other suitable fibrous material forming a filler and binder, as is commonly employed in the construction of building blocks of this character. The ingredients of the plastic composition are prepared in a suitable mixer indicated at D in Figure 1 and are automatically delivered at station E to a series of mold boxes F arranged in the form of an endless conveyor G which conveyor is mounted and arranged to carry the mold boxes on a horizontal path of travel with a continuous movement during operation; the plastic composition being delivered to the mold boxes while the latter are in motion. The conveyor G is of such length and rotates at such speed that the wet, unstable plastic composition delivered to the mold box at station E will have time to set and harden sufficiently to permit their removal from the mold boxes when the latter reach a discharge station H where the blocks are ejected from the mold boxes while the latter are advancing. The blocks are then removed while moist from the mold conveyor and placed upon an endless belt I upon which they are carried and advanced for such length of time as to permit the molded blocks to harden sufficiently to permit their being stacked in superposed relation, whereupon the blocks are removed from the conveyor I and arranged in a stack J on a car or carriage, and are then conveyed to a suitable kiln, not shown, where they are subjected to a final drying action; the car carrying the blocks being disposed in the kiln during the drying operation. The blocks may be arranged on the conveyor I and in the stack J in any desired position and by any suitable means, being here shown as arranged on edge. The transfer of the blocks from the mold conveyor G to the endless conveyor I and from the conveyor I to the stack J may be effected manually.

The mold conveyor G is of such length and is run with such speed that the mold boxes will travel about ten minutes between the stations E and H, and the endless conveyor I is of such length and moves at such speed that a block may be carried forward thereon for about ten minutes.

The mixer D is here shown as comprising a horizontally extending cylinder 15 to which a mixture of fibrous and cementitious materials is delivered from a pair of hoppers 16 and 17 through a feed pipe 18. The cementitious material in dry powdered form is delivered to the hopper 16 by a conveyor 19, and the fibrous material consisting of sawdust or the equivalent thereof being delivered to the hopper 17 by the conveyor 20; the conveyors 19 and 20 leading from suitable reservoirs of the dry materials. The hoppers 16 and 17 open to cylinders 21 and 22 which communicate with branch pipes 23 leading to the common feed pipe 18; the hoppers being fitted with agitators 24 by which the materials delivered thereto are acted on to reduce lumps and insure their delivery to the cylinder 15 in a powdered form. The cylinders 21 and 22 are fitted with screw conveyors 25 which serve to insure a uniform discharge of the materials to the cylinder 15. The screw conveyors 25 are driven through change speed pulleys 26 which are adapted to be adjusted to vary the speed of the screw conveyors so as to enable the delivery to the cylinder 15 of the cementitious and fibrous materials in any desired proportions, as occasion may require. The cylinder 15 is fitted with an agitator 27 consisting of blades 28 mounted on a shaft 28' extending longitudinally through the cylinder, which shaft is adapted to be rotated so as to cause the blades to agitate the material delivered to the cylinder and also effect their rapid advance longitudinally thereof, from the feed pipe 18 located adjacent one end of the cylinder to a discharge pipe 29 located adjacent the other end thereof, and which discharge pipe leads downwardly and terminates in a rectangular nozzle 30 which opens directly above a mold box F in the mold conveyor G. A water feed pipe 31 connects with the cylinder 15 at a suitable point between the intake pipe 18 and discharge pipe 29 through which water is supplied to the cementitious and fibrous materials in the cylinder and is thoroughly intermixed therewith by the agitators 27 to form a wet unstable plastic mass which will be discharged to the mold boxes through the nozzle 30.

The mold conveyor G comprises a series of a large number of hingedly connected mold boxes F arranged in an endless chain which passes around horizontal sprocket wheels 32 and 33 carried on the upper end portions of vertical shafts 34 and 35, fitted with worm wheels 36 and 37 engaged by worms 38 and 39 on a drive shaft 40. This drive shaft may be driven from any suitable source of power. The mold conveyor G is supported on inner and outer endless rails 41 and 42 which are here shown as formed of channel iron arranged alongside the mold boxes with their channels opening towards the end walls thereof to receive and carry rollers 43 and 44 carried on the ends of the mold boxes as will be later described.

Each of the mold boxes, F is constructed as particularly shown in Figures 6, 7 and 8 (Sheet 2), and comprises side walls 45 and 46 and end walls 47 and 48, which walls form a rectangular structure which is open at top and bottom and is divided into a series of compartments here shown as four in number, and indicated at $a$, $b$, $c$, and $d$, by partitions 49. The upper edges of the side and end walls extend on a plane and are bounded by a horizontal marginal flange 50, and the upper edges of the partitions 49 extend flush with the upper edges of the side and end walls. A series of transverse bars 51 extend between the side walls 45 and 46 through notches 52 formed in the lower edges of the partitions 49, and carried on the bars 51 are upwardly projecting cylinders 53 constituting cores, there being a series of such cylinders arranged in each of the compartments $a$, $b$, $c$, $d$ and spaced apart therein, and from the sides and ends of the compartments, so as to form a mold space around each core. The upper ends of the cylinders 53 are closed and terminate on a plane spaced a short distance below the plane of the upper edges of the walls and partitions. The end wall 47 carries a frame 54 fitted with spindles 55 which project outwardly therefrom and form bearings for the rollers 44 that travel on the outer rail 42. The inner end wall 48 carries a plate 56 from which project spindles 57 forming bearings for the rollers 43 which travel on the inner rail 41. The ends of the plates 56 project beyond the plane of the side walls 45 and 46 and are formed with apertured bosses 58 to receive pivot pins 59, by means of which adjacent mold boxes are hingedly connected together so as to have articulate movement relative to each other and form an endless chain to pass around the sprocket wheels 32 and 33; the sprocket wheels being formed with peripheral recesses 60 adapted to engage projecting upper end portions 61 of the pivot pins 59 so as to effect a sprocket connection with the endless chain of mold boxes and effect movement thereof on driving the sprocket wheels.

Mounted within each of the compartments a, b, c, d of each mold box is a false bottom 62 comprising a rectangular plate the margins of which slidably conform to the walls of the compartments, and which plate is formed with circular apertures 63 slidably encircling the cylinders 53 to permit vertical movement of the false bottom. This false bottom normally seats on the rods 51, as shown in Figure 7.

Means are provided for effecting vertical movement of the false bottom 62 which is here shown as comprising downwardly extending projections 64 and 65 affixed to the ends of the bottom plate 62, and which projections are adapted to be engaged by an ejecting mechanism 66, as shown in Figures 1, 9, and 10, whereby the projections 64 and 65 with the bottom plate 62 may be moved upwardly. This ejecting device 66 is located at the discharge station H and comprises an endless chain 67 passing around rollers 68 and 69, the upper lead of which endless chain extends upwardly at an incline beneath the projections 64 and 65, so as to form inclined planes, up which the projections travel while being advanced with the mold box conveyor. The chain 67 may be driven from any suitable source of power and is designed to travel in unison with the mold conveyor. In order to oppose depression of the upper lead of the chain 67, the latter is passed over a supporting ledge 70 which ledge is inclined at one end and has a horizontally extending portion 70' at its opposite end so that the upper lead of the chain 67 will have correspondingly inclined and horizontal portions. By this construction the projections 64 and 65 may be caused to move upward by the inclined portion of the chain 67 and will be maintained in their uppermost position for a distance by the horizontally extending portion of the chain. By employing chain 67 and driving it at a speed corresponding to the forward movement of the mold boxes no sliding frictional movement is imposed on the lower ends of the projections.

An important feature of this ejecting device 66 resides in the fact that the false bottoms of the molds will be caused to initially move upward in successive order so that the work of starting the ejection of the blocks from the molds will be imposed on one block at a time as will later appear.

Means are provided for restoring the false bottoms to their normal lowermost positions after the blocks have been removed therefrom, which is here shown as comprising a pair of downwardly inclined rails 71 and 72, which are positioned to extend in the path of travel of pins 73 and 74 extending outwardly from the lower end portions of the projections 64 and 65, on the false bottoms 62, in such manner that as the mold boxes are advanced the pins 73 and 74 in engaging the underside of the rails 71 and 72 will act to draw the false bottoms downwardly to their normal lowermost positions.

Means are provided for spraying the mold blocks with oil after the blocks have been removed therefrom and before the wet plastic is delivered thereto which means is here shown as comprising a series of pipes 75 which extend horizontally above the mold boxes and connect with a suitable source of oil supply under pressure; the pipes 75 being formed with a series of discharge orifices 76 on their under sides adapted to direct sprays of oil downwardly into the mold boxes as the latter pass therebeneath. These pipes are here shown as disposed at a point to deliver the oil to the mold boxes immediately after the removal of the blocks therefrom, and at a point in the conveyor G such distance from the filling station E that the mold boxes after receiving a bath of oil will be advanced during a time sufficient to permit excess oil to drain from the mold boxes. A drip pan 77 is arranged to catch the oil drained from the mold boxes, from whence the oil is delivered to a suitable reservoir, not shown, so that it may be pumped back through the oil distributing pipes.

The operation of the invention will be understood from the foregoing, it being seen that on delivering a wet plastic composition through the nozzle 30 to the open upper ends of the mold boxes, as shown in Figure 5, the mold boxes will be filled successively as the mold conveyor advances; the mold boxes being filled flush with their upper edges by a workman with the aid of a trowel or similar tool. To facilitate this operation, a pair of panels $a'$ and $b'$ are mounted to seat on the side flanges 50 of the molds as the latter pass beneath the nozzle 30 as shown in Figure 5 so as to prevent overflow of the plastic at the sides of the boxes. The feed of the plastic is regulated so that such quantity will be discharged as to just fill the molds, but a volume is fed initially somewhat in excess of that required to fill a mold so as to give a supply which piles up in the trough formed between the panels $a'$ and $b'$ which the workman works back as the molds advance so as to properly fill the molds. The panels $a'$ and $b'$ are here shown as slidably mounted in guideways $c'$ and $d'$ on the nozzle 29 and arranged in sliding contact with the upper surfaces of the mold boxes. The adjacent mold boxes are arranged with their projecting flanges 50 contacting and thereby obviating any space between the contiguous mold boxes so there will be practically no waste of the plastic by reason of portions thereof being discharged between the advancing mold boxes.

The mold boxes being thus filled are carried forward as before described, such length of time as to permit the plastic to set; whereupon, the false bottoms are elevated by the ejector 66 as before stated being elevated successively, one at time in their initial upward movement, as particularly shown in Figure 9. This is important in that it minimizes the amount of power required to operate the machine, as the plastic in expanding offers considerable resistance to initial movement. As a means for breaking suction in the chambers C of the blocks as the latter are moved upward from the cores which would tend to draw the plastic walls of the openings inwardly and thereby distort the block, tapered projections $e$ are provided on the upper ends of the cores which serve to form small vents $f$ in the ends of the chambers C. When the projections 64 and 65 are traversing the horizontal uppermost portions of the chain 67, then the false bottoms will be disposed in their uppermost position with the blocks seated thereon as particularly shown in Figure 10, whereupon the blocks may be removed in any suitable manner. This removal may be successfully accomplished by hand. The blocks may be lifted one at a time from the mold conveyor and placed upon the conveyor belt I and are then carried forward for such a distance and such length of time as to harden and set, whereupon they are stacked as indicated at J on a wheeled truck 78 and conveyed thereby into a suitable kiln where the blocks are thoroughly dried.

After the blocks have been lifted from the molds at station H the false bottoms are restored to their normal lowermost positions by the action of the inclined rails 71—72 on the pins 73—74, as before described, during which time the interior walls of the molds are given an oil bath as before stated.

As a means for preventing jamming of false bottoms in event of sticking thereof, the rails 71 are pivoted at their upper ends as indicated at $g$ to the standards $h$ and are subjected to a yieldable pull by springs $i$ so that the rails may exert a yielding pull on the false bottoms.

While I have shown and described a specific embodiment of my invention, I do not limit myself to the exact details of construction and the arrangement of parts herein shown, but may employ such changes and modifications as come within the scope of the appended claims.

I claim—

1. In a hollow block molding machine, a series of connected mold boxes, means for advancing said mold boxes continuously, means for feeding a wet unstable plastic composition to said mold boxes, cores in said mold boxes, means for ejecting molded blocks from said boxes, and means carried by said cores for breaking suction in the blocks as the latter are ejected.

2. In a machine for molding hollow blocks, a mold box divided into a series of compartments, means for advancing said mold box continuously, a false bottom in each of said compartments, and means for elevating said false bottoms operable to initially move said false bottoms consecutively as the mold box advances.

3. In a machine for molding hollow blocks, a mold box divided into a series of compartments, means for advancing said mold box continuously, a false bottom in each of said compartments, means for elevating said false bottoms operable to initially move said false bottoms consecutively as the mold box advances, and means for restoring said false bottoms to their normal lowermost positions.

4. In a machine of the class described, an endless series of hingedly related mold-boxes, means for imparting continuous motion to the series, means for guiding the series of mold-boxes in a constant plane, means dividing each mold-box into several mold-compartments, an ejector for each compartment, an endless chain bearing an angle inclined relative to the trend of movement of the mold-boxes for engagement with the ejectors, and means for moving the endless chain in synchronism with the mold-boxes.

5. In a machine of the class described, an endless series of hingedly related mold-boxes, means for imparting continuous motion to the series, means for guiding the series of mold-boxes in a constant plane, means dividing each mold-box into several mold-compartments, an ejector for each compartment, an endless chain bearing an angle inclined relative to the trend of movement of the mold-boxes for engagement with the ejectors, means for moving the endless chain in synchronism with the mold-boxes, whereby the combined movements of the mold-boxes and chain automatically operate to eject molded articles from the mold-boxes, and means for restoring the ejectors comprising an element bearing an angle differing from said chain and fixed in the path of said ejectors.

6. In a machine for forming articles of plastic material, comprising an endless trackway, an endless series of hingedly connected mold-boxes, means for imparting continuous movement to the series of mold-boxes, means for continuously supplying plastic material to the mold-boxes, an article ejector for each mold-box, an endless chain for operating the ejectors arranged at an angle to and located in the path of said ejectors, and means comprising a fixed element disposed at an angle opposite the angle of said chain for restoring the ejectors.

GEORGE A. BUTTRESS.